United States Patent
Pirk et al.

(10) Patent No.: US 11,887,363 B2
(45) Date of Patent: Jan. 30, 2024

(54) TRAINING A DEEP NEURAL NETWORK MODEL TO GENERATE RICH OBJECT-CENTRIC EMBEDDINGS OF ROBOTIC VISION DATA

(71) Applicant: Google LLC, Mountain View, CA (US)

(72) Inventors: Soeren Pirk, Palo Alto, CA (US); Yunfei Bai, Fremont, CA (US); Pierre Sermanet, Palo Alto, CA (US); Seyed Mohammad Khansari Zadeh, San Carlos, CA (US); Harrison Lynch, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 476 days.

(21) Appl. No.: 17/279,924

(22) PCT Filed: Sep. 27, 2019

(86) PCT No.: PCT/US2019/053554
§ 371 (c)(1),
(2) Date: Mar. 25, 2021

(87) PCT Pub. No.: WO2020/069379
PCT Pub. Date: Apr. 2, 2020

(65) Prior Publication Data
US 2021/0334599 A1    Oct. 28, 2021

Related U.S. Application Data

(60) Provisional application No. 62/737,794, filed on Sep. 27, 2018.

(51) Int. Cl.
*G06V 20/10*    (2022.01)
*B25J 9/16*    (2006.01)
(Continued)

(52) U.S. Cl.
CPC ............ *G06V 20/10* (2022.01); *B25J 9/1697* (2013.01); *B25J 13/003* (2013.01);
(Continued)

(58) Field of Classification Search
CPC .. G06T 7/11; G06T 7/70; G06F 18/24; G06N 20/00; G06B 6/032; G06Z 99/00
See application file for complete search history.

(56) References Cited

U.S. PATENT DOCUMENTS 9,569,736 B1 *   2/2017  Ghesu ................... G06N 20/00
10,089,575 B1 * 10/2018  Redmon ................. G06N 3/08
(Continued)

FOREIGN PATENT DOCUMENTS

WO    2018148493    8/2018

OTHER PUBLICATIONS

Agrawal, P. et al., "Learning to See by Moving;" In International Conference on Computer Vision (ICCV); 9 pages; 2015.
(Continued)

*Primary Examiner* — Yosef Kassa
(74) *Attorney, Agent, or Firm* — Gray Ice Higdon

(57) ABSTRACT

Training a machine learning model (e.g., a neural network model such as a convolutional neural network (CNN) model) so that, when trained, the model can be utilized in processing vision data (e.g., from a vision component of a robot), that captures an object, to generate a rich object-centric embedding for the vision data. The generated embedding can enable differentiation of even subtle variations of attributes of the object captured by the vision data.

19 Claims, 8 Drawing Sheets

(51) Int. Cl.
    B25J 13/00      (2006.01)
    G05B 13/02     (2006.01)
    G06N 3/08      (2023.01)
    G10L 15/22     (2006.01)
    G06F 18/21     (2023.01)
    G06F 18/2413   (2023.01)
    G06V 10/764    (2022.01)
    G06V 10/70     (2022.01)
    G06V 10/776    (2022.01)
    G06V 10/82     (2022.01)

(52) U.S. Cl.
    CPC ......... *G05B 13/027* (2013.01); *G06F 18/217* (2023.01); *G06F 18/2413* (2023.01); *G06N 3/08* (2013.01); *G06V 10/764* (2022.01); *G06V 10/768* (2022.01); *G06V 10/776* (2022.01); *G06V 10/82* (2022.01); *G10L 15/22* (2013.01)

(56) References Cited

U.S. PATENT DOCUMENTS

| | | | | |
|---|---|---|---|---|
| 10,163,011 | B2* | 12/2018 | Kaehler | H04N 13/398 |
| 10,373,116 | B2* | 8/2019 | Medina | G06Q 10/087 |
| 10,628,708 | B2* | 4/2020 | Lin | G06F 18/211 |
| 10,788,836 | B2* | 9/2020 | Ebrahimi Afrouzi | |
| | | | | G05D 1/0274 |
| 2018/0039848 | A1 | 2/2018 | Konolige et al. | |

OTHER PUBLICATIONS

Arora, H. et al., "Unsupervised Segmentation of Objects using Efficient Learning;" IEEE Conference on Computer Vision and Pattern Recognition (CVPR); 7 pages, Jun. 2007.
Aytar, Y. et al., "SoundNet: Learning Sound Representations from Unlabeled Video;" In Conference on Neural Information Processing Systems (NIPS); 9 pages; 2016.
Dehzangi, O. et al., "IMU-Based Gait Recognition Using Convolutional Neural Networks and Multi-Sensor Fusion;" Sensors, 17(12); 22 pages; 2017.
DeTone, D. et al., "SuperPoint: Self-Supervised Interest Point Detection and Description;" Cornell University, arXiv.org, arXiv:1712.07629v2; 12 pages; Dec. 22, 2017.
Doersch, C. et al., "Unsupervised Visual Representation Learning by Context Prediction;". In IEEE International Convention on Computer Vision (ICCV); 9 pages; 2015.
Dumoulin, V. et al., "Adversarially Learned Inference;" Cornell University, arXiv.org; arXiv: 1606.00704 v2; 16 pages; Dec. 13, 2016.
Finn, C. et al., "Learning Visual Feature Spaces for Robotic Manipulation with Deep Spatial Autoencoders;" Cornell University; arXiv.org; arXiv:1509.06113v1; 8 pages; Sep. 21, 2015.
Florence, P. et al., "Dense Object Nets: Learning Dense Visual Object Descriptors by and for Robotic Manipulation;" Cornell University, arXiv.org; arXiv:1806.08756v2; 12 pages; 2018.
Fritz, M. et al., "Decomposition, Discovery and Detection of Visual Categories Using Topic Models;". In IEEE Conference on Computer Vision and Pattern Recognition (CVPR); 8 pages; Jun. 2008.
Haller, E. et al., "Unsupervised Object Segmentation in Video by Efficient Section of Highly Probable Positive Features;" In Proceedings of the IEEE International Conference on Computer Vision (ICCV); 9 pages; 2017.
He, K. et al., "Deep Residual Learning for Image Recognition;" Proceedings of the IEEE Conference on Computer Vision and Patter Recognition (CVPR); pp. 770-778, 2016.
He, K. et al., "Mask R-CNN;" Proceedings of the IEEE Conference on Computer Vision (ICCV); pp. 2961-2969; 2017.
Held, D. et al., "Deep Learning for Single-View Instance Recognition;" Cornell University; arXiv.org; arXiv:1507.08286v1; 16 pages; 2015.
Hickson, S. et al., "Object Category Learning and Retrieval with Weak Supervision;" Cornell University; arXiv.org; arXiv: 1801.08985v2; 6 pages; Jul. 23, 2018.
Jain, S. et al., "FusionSeg: Learning to combine motion and appearance for fully automatic segmentation of generic objects in videos;" In Proceedings of the IEEE Conference on Computer Vision and Pattern Recognition (CVPR); 10 pages; 2017.
Karpathy, A. et al., "Object discovery in 3D scenes via shape analysis;" In IEEE International Conference on Robotics and Automation (ICRA); pp. 2088-2095; May 2013.
Kim, G. et al., "Unsupervised Modeling of Object Categories Using Link Analysis Techniques;" In IEEE Conference on Computer Vision and Pattern Recognition (CVPR); 8 pages; 2008.
Kumar, B.G.V. et al., "Learning Local Image Descriptors with Deep Siamese and Triplet Convolutional Networks by Minimising Global Loss Functions," Cornell University; arXiv.org; arXiv:1512.09272v1; 9 pages; Dec. 31, 2015.
Kwak, S. et al., "Unsupervised Object Discovery and Tracking in Video Collections;" In Proceedings of the IEEE International Conference on Computer Vision (ICCV); pp. 3173-3181; 2015.
Lin, T-Y. et al., "Learning Deep Representations for Ground-To-Aerial Geolocalization;" In Proceedings of the IEEE Conference on Computer Vision and Pattern Recognition (CVPR); pp. 5007-5015; 2015.
Lin, T-Y. et al., "Microsoft COCO: Common Objects in Context;". In David Fleet et al. (Eds.): ECCV, Part V, LNCS 8693; pp. 740-755; 2014.
Lin, T-Y. et al., "Feature Pyramid Networks for Object Detection;" In Proceedings of the IEEE Conference on Computer Vision and Pattern Recognition (CVPR); pp. 2117-2125; 2017.
Mishra, A.K. et al., "Segmenting Simple Objects Using RGB-D;" In IEEE International Conference on Robotics and Automation (ICRA); pp. 4406-4413, May 2012.
Owens, A. et al., "Visually Indicated Sounds;" In Proceedings of the IEEE Conference on Computer Vision and Pattern Recognition (CVPR); pp. 2405-2413, 2016.
Pathak, D. et al., "Curiosity-driven Exploration by Self-supervised Prediction;" In Proceedings of the 34th International Conference on Machine Learning (ICML); 10 pages; 2017.
Pathak, D. et al., "Learning Features by Watching Objects Move;" In Proceedings of the IEEE Conference on Computer Vision and Pattern Recognition (CVPR); pp. 2701-2710; 2017.
Paulin, M. et al., "Local Convolutional Features With Unsupervised Training for Image Retrieval;" In Proceedings of the IEEE International Conferences on Computer Vision (ICCV); pp. 91-99; 2015.
Pot, E. et al., "Self-supervisory Signals for Object Discovery and Detection;" Cornell University; arXiv.org; arXiv:1806.03370v1; 10 pages; Jun. 8, 2018.
Radford, A. et al., Unsupervised Representation Learning with Deep Convolutional Generative Adversarial Networks; Cornell University; arXiv.org; arXiv:1511.06434v1; 15 pages; Nov. 19, 2015.
Collet, A. et al., "The MOPED framework: Object recognition and pose estimation for manipulation;" International Journal of Robotics Research 30(10); pp. 1284-1306; 2011.
Russell, B. et al., "Using Multiple Segmentations to Discover Objects and their Extent in Image Collections;" In Proceedings of IEEE Conference on Computer Vision and Pattern Recognition (CVPR); 8 pages; 2006.
Schuller, S. el al., "Unsupervised Object Discovery and Segmentation in Videos;" In Proceedings of British Machine Vision Conference (BMVC); 12 pages; 2013.
Sermanet, P. et al., "Time-Contrastive Networks: Self-Supervised Learning from Video;" In IEEE International Conference on Robotics and Automation (ICRA); pp. 1134-1141; May 2018.
Sivic, J. et al., "Discovering Objects and their Location in Images;" In Proceedings of IEEE International Conference on Computer Vision (ICCV); 8 pages; Oct. 2005.
Sohn, K.; "Improved Deep Metric Learning with Multi-class N-pair Loss Objective;" In 30th Conference on Neural Information Processing Systems (NIPS); 9 pages; 2016.

(56) References Cited

OTHER PUBLICATIONS

Szegedy, C. et al., "Rethinking the Inception Architecture for Computer Vision;" In Proceedings of the IEEE Conference on Computer Vision and Pattern Recognition (CVPR); pp. 2818-2826; 2016.

Tuytelaars, T. et al., "Unsupervised Object Discovery: A Comparison;" International Journal of Computer Vision (IJCV); 19 pages; 2009.

Uijlings, J.R.R. et al., "Selective Search for Object Recognition;" International Journal of Computer Vision (IJCV); 18 pages; 2013.

Vincent, P. et al., "Extracting and Composing Robust Features with Denoising Autoencoders;" In Proceedings of the 25th International Conference on Machine Learning (ICML); 8 pages; 2008.

Wang, L. et al., "Video Object Discovery and Co-segmentation with Extremely Weak Supervision;" In ECCV, Part IV, LNCS 8692; pp. 640-655; 2014.

Wang, X. et al., "Unsupervised Learning of Visual Representations using Videos;" Proceedings of the IEEE International Conference on Computer Vision (ICCV); pp. 2794-2802; 2015.

Wu, Z. et al., "3D ShapeNets: A Deep Representation for Volumetric Shapes;" In Proceedings of the IEEE Conference on Computer Vision and Pattern Recognition; pp. 1912-1920; 2015.

Zagoruyko, S. et al., "Learning to Compare Image Patches via Convolutional Neural Networks;" In Proceedings of the IEEE Conference on Computer Vision and Pattern Recognition (CVPR); pp. 4353-4361; 2015.

Zhang, H. et al., mixup: Beyond Empirical Risk Minimization; In ICLR; 13 pages; 2018.

Zhang, R. et al., "Split-Brain Autoencoders: Unsupervised Learning by Cross-Channel Prediction;" In Proceedings of the IEEE Conference on Computer Vision and Pattern Recognition (CVPR); pp. 1058-1067; 2017.

European Patent Office; Communication pursuant to Article 94(3) EPC issued in Application No. 19790934.4; 6 pages; dated Apr. 24, 2023.

Zeng, A. et al., "Multi-view Self-supervised Deep Learning for 6D Pose Estimation in the Amazon Picking Challenge;" 2017 IEEE International Conference on Robotics and Automation; pp. 1386-1393; May 29, 2017.

Ramik, D. et al., "A Cognitive Approach for Robots' Vision Using Unsupervised Learning and Visual Saliency;" International Conference on Financial Cryptography and Data Security; [Lecture Notes in Computer Science], Springer, Berlin, Heidelberg, pp. 81-88; Jun. 8, 2011.

Sermanet, P. et al., "Time-Contrastive Networks: Self-Supervised Learning from Video;" 2018 International Conference on Robotics and Automation; pp. 1134-1141; May 21, 2018.

Yuan, Y. et al., "Hard-Aware Deeply Cascaded Embedding;" 2017 International Conference on Computer Vision; pp. 814-823; Oct. 22, 2017.

Balntas, V. et al., "Learning local feature descriptors with triplets and shallow convolutional neural networks;" Proceedings of the British Machine Vision Conference; 11 pages; Sep. 19, 2016.

Sohn, K. "Improved Deep Metric Learning with Multi-class N-pair Loss Objective;" retrieved from internet: https://papers.nips.cc/paper/6200-improved-deep-metric-learning-with-multi-class-n-pair-loss-objective.pdf; 9 pages; Dec. 1, 2016.

European Patent Office; International Search Report and Written Opinion of Ser. No. PCT/US2019/053554; 20 pages; dated Dec. 12, 2019.

Liu, S. et al., "SSD: Single Shot Multibox Detector;" In European Conference on Computer Vision; 17 pages; 2016.

Mitash, C. et al., "A Self-Supervised Learning System for Object Detection Using Physics Simulation and Multi-View Pose Estimation;" IEEE International Conference on Intelligent Robots and Systems (IROS); 7 pages; 2017.

Pinto et al.; Supersizing Self-supervision_ Learning to Grasp from 50K Tries and 700 Robot Hours; 2016 IEEE International Comference on Robotics and Automation (ICRA); pp. 3406-3413; dated May 16, 2016.

Ren, S., et al.; Faster R-CNN: Towards Real-Time Object Detection with Region Proposal Networks; Advances in Neural Information Processing Systems; p. 1-9; dated 2015.

* cited by examiner

TRAINING A DEEP NEURAL NETWORK MODEL TO GENERATE RICH OBJECT-CENTRIC EMBEDDINGS OF ROBOTIC VISION DATA

BACKGROUND

The ability to independently discover objects in previously unseen environments and to explore their properties for planning and executing robotic tasks is a critical skill for robust robotic agents. The ability to recognize and differentiate objects, with similar perceptual and semantic features, enables more informed robotic behavior and thereby improved robotic task performance. For example, a robot tasked to "get a red mug" in an environment with objects that offer overlapping affordances (such as bowls or cups) may only be successful if it is able to effectively differentiate visual (e.g., color of an object, material of an object) and semantic (e.g., object is a container, object has a handle) attributes. However, the variance of objects in all their nuances in shape, appearance, and functionality, makes this a challenging task.

Some supervised learning techniques have been utilized to successfully associate objects with labels of their attributes (e.g., through classification, detection, and segmentation). However, supervision is impractical to work reliably at the required scale for applications in robotics, as obtaining meaningful labels for objects encountered in robotics environments, and their attributes, is often infeasible and/or computationally burdensome.

SUMMARY

Various implementations disclosed herein are directed to training a machine learning model (e.g., a neural network model such as a convolutional neural network (CNN) model) so that, when trained, the model can be utilized in processing vision data (e.g., from a vision component of a robot), that captures an object, to generate a rich object-centric embedding for the vision data. The generated embedding can enable differentiation of even subtle variations of attributes of the object captured by the vision data. For example, the generated embedding can enable differentiation of very similar objects with subtle variations in their appearance (e.g., color variations, slight shape variations, affordance variations, etc.), even in unknown environments.

Various implementations disclosed herein are additionally or alternatively directed to utilization of such a trained model in robotic control. For example, some of those implementations utilize such a trained model in processing vision data captured by a vision component of a robot, generate embeddings based on the processing, and control the robot based at least in part on the generated embeddings. For instance, some of those implementations can: generate or identify a query embedding in an embedding space of the trained model (where the query embedding represents an embedding of rich feature(s) of target object(s) to be interacted with by the robot); process vision data, captured by the vision component of the robot, using such a trained model; generate embedding(s) based on the processing; and control the robot to interact with target object(s) that have embedding(s) that are close (in embedding space) to the query embedding. Utilizing a model, trained according to implementations disclosed herein, in generating the embedding(s), enables the robot to recognize and interact with target object(s) having similar perceptual and semantic features, thereby improving performance of the robot. Put another way, utilizing a model, trained according to implementations disclosed herein, may enable a robotic agent to more accurately identify objects in the real world.

Implementations disclosed herein learn an embedding, through training of an object-contrastive model (e.g., a CNN), where the learned embedding provides differentiation between even subtle variations of object attributes. Some of those implementations learn the embedding by attending to individual objects in various environments during training. For example, at each of multiple iterations, and for each of multiple single view camera trajectories around multiple disparate static object arrangements in various environments, two image frames of the single view camera trajectory are selected, and objects detected in the selected images: $\theta_n$, $\rho_m$, where n and m respectively represent the number of detected objects. Cropped images of detected objects are then embedded as feature vectors by employing a metric learning strategy. The goal of the metric learning strategy is that objects with homogeneous attributes exhibit similar features in the embedding space, and thereby are closer together, while those with heterogeneous attributes are dissimilar and therefore further apart. Various implementations abstain from using (put another way, do not require) labels for the training and instead rely on the metric learning loss as a self-supervised learning objective, which, perhaps somewhat surprisingly, is capable of producing accurate object correspondences. Accordingly, in those various implementations, computationally intensive supervised labeling of training data can be avoided. In other words, those various implementations can train the object-centric model using only (or a majority of) non-labeled data— thereby obviating the need for labeling of training data, and conserving computational resources that would otherwise be needed in generating supervised labels for training data. For example, computational resources that can be conserved include client device resources required in supervised labeling such as processor resources for rendering images, enabling a reviewer to provide user interface input for the rendered images to indicate matching objects amongst the rendered images, etc. Furthermore, by removing the need for supervision, continuous representations, which are richer and less biased than ones supervised by a limited set of discrete labels, may be learned. Unbiased representations can prove useful in unknown future environments different from the ones seen during supervision. In addition, the techniques described herein may be effective without employing additional self-supervisory training signals such as tracking or depth. For instance, the only inputs to the system may be monocular images or videos. This may serve to simplify data collection and may allow the generated embedding to integrate into existing end-to-end learning pipelines.

More particularly, in various implementations disclosed herein a large quantity of single view camera trajectories around multiple object arrangements are obtained, where each of the camera trajectories includes a sequence of images of an environment from different points of view. The object arrangements for each of the camera trajectories can be varied. For example, the objects themselves can be varied (i.e., a different collection of objects can be present), the poses of objects can be varied, the quantity of objects can be varied, etc. Further, the environment in which the objects are arranged can be varied among different camera trajectories.

A pair of images can then be selected from a camera trajectory, where the pair includes a first image and a second image. The first image captures corresponding objects from a first point of view, and the second image captures at least a subset of the corresponding objects from a second point of view. The first image and the second image will capture many (or all) of the same objects, but, for some image pairs, may not capture all of the same objects due to occlusion, lighting conditions, and/or other factors. The first image can be processed using an object recognition model to identify a plurality of first object regions in the first image, where each of the first object regions correspond to a respective one of the objects captured by the first image. The object recognition model can be, for example, faster-RCNN and/or other model that generates class agnostic bounding box proposals of objects present in an image. The bounding box proposals can each be a first object region. A plurality of first object images can then be generated based on the first object regions (e.g., each can be an optionally scaled crop of a respective region). Accordingly, each of the first object images is based on a respective one of the first object regions and captures a respective one of the objects. The second image can be similarly processed using the object recognition model to identify a plurality of second object regions in the second image, where each of the second object regions corresponds to a respective one of the objects captured by the second image. Further, a plurality of second object images can be generated based on the second object regions, where each of the second object images is based on a respective one of the second object regions and captures a respective one of the objects.

The first object images can be processed using an object-contrastive model to generate respective first object image embeddings, and the second object images can be processed using the object-contrastive model to generate respective second object image embeddings. A plurality of anchor, positive pairs can be generated, where each of the pairs include a respective one of the first object image embeddings (the "anchor" in the "anchor, positive pair") and a respective one of second object image embeddings determined to be most similar to the respective one of the first object image embeddings (the "positive" in the "anchor, positive pair"). For example, the positive pairing for a given first object image embedding can be the second object image embedding that is closest, in embedding space, to the given first object image embedding. Similarly, the positive pairing for another given first object image embedding can be the second object image embedding that is closest, in embedding space, to the other given first object image embedding. At least one metric loss can then be generated based on contrasting the anchor, positive pairs with anchor, negative pairs. The anchor, negative pairs each include a respective one of the first object image embeddings (the "anchor" in the "anchor, negative pair") and a respective one of the second object image embeddings not determined to be most similar to the respective one of the first object image embeddings (the "negative" in the "anchor, negative pair"). In some implementations, the metric loss is an n-pairs loss where there is not an explicit formulation of anchor, negative pairs, but, instead the other positives are used as negatives in a minibatch as negative examples for a given anchor, positive pair. Other metric losses could optionally be utilized, such as triplet loss. The object-contrastive model can then be updated based on the at least one metric loss. This can occur for a large quantity of image pairs from a large quantity of camera trajectories. For example, thousands of camera trajectories can be provided and multiple image pairs utilized from each of the camera trajectories. Through such continued training and through such large quantity of self-super-vised training, the object-contrastive model learns an embedding that enables differentiation of subtle variations of object attributes.

Observing the same object across different views facilitates learning invariance to scene-specific properties, such as scale, occlusion, lighting, and background, as each frame exhibits variations of these factors in each individual frame. This allows the object-contrastive model to learn how to more clearly differentiate object-centric attributes, such as shape, function, texture, or color, as these appear similar for anchor, positive pairs, and dissimilar for anchor, negative pairs. The object-contrastive model, trained in such a manner, can directly improve performance of a robot in performance of various robotic tasks, when the robot utilizes the trained object-contrastive model in the performance of those robotic tasks.

Some implementations train the object-contrastive model using simulated camera trajectories and/or real camera trajectories. Simulated camera trajectories are those that are based on simulated images, where the simulated images are rendered from points of view of a simulated vision component based on simulated environments with simulated placements of various simulated objects. The simulated environments and the simulated images can be rendered using one or more simulators each executing on one or more computing devices. Real camera trajectories are based on images captured from real-world vision components moving around an environment while staying directed at the same objects in the environment. In some implementations, the vision component can be integrated with a robot, and the images can be captured as the robot navigates around the environment. In some additional or alternative implementations, the vision component can be held by a human user, and the images can be captured as the human user navigates around the environment. In some implementations, the object-contrastive model is initially trained using simulated camera trajectories, then adapted through further training that is based on real camera trajectories.

Once trained, the object-contrastive model can be utilized in control of a robot. As one example, the robot can be controlled to interact with a target object by: determining a query embedding, in an embedding space of the object-contrastive model; processing a robot image, from a vision component of the robot, using the object-contrastive model; determining, based on the processing, a target object in a current environment of the robot; and controlling the robot to interact with the target object. For example, the target object can be determined to correspond to a region of the robot image that has a respective embedding that is within a threshold distance of the query embedding. The region of the robot image can be one of multiple regions considered and can be identified, for example, using an object detection model described herein. In some implementations, the query embedding can be determined based on voice input and/or based on an image of the target object. For example, "red mug" in voice input of "retrieve the red mug" can be mapped to a given point in the embedding space (e.g., through labeling of the embedding space with semantic text labels after training). Also, for example, a user can point to a "red mug" and provide a visual, verbal, and/or touch command to retrieve similar objects. Image(s) of the "red mug" can be captured (or cropped from a larger image using object recognition techniques), using the user's pointing as a queue, and the image(s) processed using the object-contrastive model to determine a query embedding.

The above description is provided as an overview of some implementations of the present disclosure. Further description of those implementations, and other implementations, are described in more detail below.

In some implementations, a method implemented by one or more processors is provided and includes identifying a first image of an environment and a second image of the environment. The first image captures objects in the environment and is captured from a first point of view, and the second image captures at least a subset of the objects in the environment and is captured from a second point of view. The method further includes processing the first image using an object recognition model to identify a plurality of first object regions in the first image, where each of the first object regions correspond to a respective one of the objects captured by the first image. The method further includes generating a plurality of first object images based on the first object regions, where each of the first object images is based on a respective one of the first object regions and captures a respective one of the objects. The method further includes processing the second image using the object recognition model to identify a plurality of second object regions in the second image, where each of the second object regions corresponds to a respective one of the objects captured by the second image. The method further includes generating a plurality of second object images based on the second object regions, where each of the second object images is based on a respective one of the second object regions and captures a respective one of the objects. The method further includes processing each of the first object images using an object-contrastive model to generate respective first object image embeddings. The object-contrastive model is a deep neural network model. The method further includes processing each of the second object images using the object-contrastive model to generate respective second object image embeddings. The method further includes generating a plurality of anchor, positive pairs that each include a respective one of the first object image embeddings and a respective one of second object image embeddings determined to be most similar to the respective one of the first object image embeddings. The method further includes generating at least one metric loss based on contrasting the anchor, positive pairs with anchor, negative pairs that each include a respective one of the first object image embeddings and a respective one of the second object image embeddings not determined to be most similar to the respective one of the first object image embeddings. The method further includes updating the object-contrastive model based on the at least one metric loss.

These and other implementations of the technology disclosed herein can optionally include one or more of the following features.

In some implementations, the environment is a real-world environment and the first image is captured by a physical robot at a first pose in the environment, and the second image is captured by the physical robot at a second pose in the environment.

In some implementations, the environment is a simulated environment and the first image is rendered from a first simulated camera pose in the environment and the second image is rendered from a second simulated camera pose in the environment.

In some implementations, the method further includes determining, for each of the plurality of anchor, positive pairs that the respective one of the first object image embeddings and the respective one of second object image embeddings are the most similar based on determining that a distance metric, between the respective one of first object image embeddings and the respective one of the second object image embeddings, is a minimum distance metric amongst differences between the first object image embeddings and the second object image embeddings.

In some implementations, the first image and the second image are rendered images generated in a simulator, and the method further includes determining, for each of the plurality of anchor, positive pairs that the respective one of the first object image embeddings and the respective one of second object image embeddings are the most similar based on determining that an identifier, assigned in the simulator, matches between the object of the respective one of first object image embeddings and the object of the respective one of the second object image embeddings. In some of those implementations, the identifier, assigned in the simulator, includes a color of the object.

In some implementations, the object-contrastive model includes a plurality of convolutional layers. In some of those implementations, the plurality of convolutional layers include a plurality of added convolutional layers, of the convolutional layers, appended to a pre-trained portion that is initialized with pre-trained weights, and the pre-trained portion also includes at least some of the convolutional layers. In some versions of those implementations, updating the object-contrastive model includes updating weights of the added convolutional layers without updating any of the pre-trained weights.

In some implementations, the object-contrastive model is not initiated with any pre-trained weights. In some of those implementations, updating the object-contrastive model includes updating weights for each of multiple layers of the object-contrastive model.

In some implementations, the metric loss is an n-pairs loss.

In some implementations, the image includes multiple color channels.

In some implementations, the image includes multiple color channels and a depth channel.

In some implementations, the image includes a three-dimensional (3D) point cloud.

In some implementations, the method further includes using, after the updating, the object-contrastive model in control of a robot. In some of those implementations, using the object-contrastive model in control of a robot includes: determining a query embedding, in an embedding space of the object-contrastive model; processing a robot image, from a vision component of the robot, using the object-contrastive model; determining, based on the processing, a target object in a current environment of the robot; and controlling the robot to interact with the target object.

In some implementations, determining the query embedding includes: receiving voice input via a microphone of the robot; and determining the query embedding based on it being mapped to a term included in the voice input. In some implementations, determining the query embedding includes: receiving a query image of an object; and processing the query image, using the object-contrastive model, to generate the query embedding.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A also illustrates object detections in the first image.

FIG. 2B also illustrates object detections in the second image.

DETAILED DESCRIPTION

Implementations disclosed herein present an unsupervised method that learns a representation to disentangle perceptual and semantic object attributes, such as shape, function, and color. This representation is learned from observations of single view camera trajectories. Pairs of images are randomly selected from the camera trajectories (with each pair being from a respective same camera trajectory, but from different points of view), the apparent objects are detected in the frames, and metric learning loss is utilized to contrast their attributes. By learning from multiple views of individual objects, the learned embedding attends to subtle variations of object attributes, which enables effective differentiation of objects across categories as well as similar instances of the same category. Unlike some other techniques, implementations disclosed herein abstain from employing additional supervisory training signals, instead relying on images from the camera trajectories for self-supervision. An embedding generated using an object-contrastive network model, trained according to implementations disclosed herein, can be used to significantly improve the performance of object-related localization and manipulation tasks with real robots. The embedding enables reliable identification of object instances based on their visual features, such as color and shape. Moreover, the embedding can also organize objects along their semantic and/or functional properties. For example, a cup might not only be associated with other cups, but also with other containers like bowls or vases. This provides a higher-level understanding of objects and enables robots to find objects that offer similar affordance(s).

Figure 1:
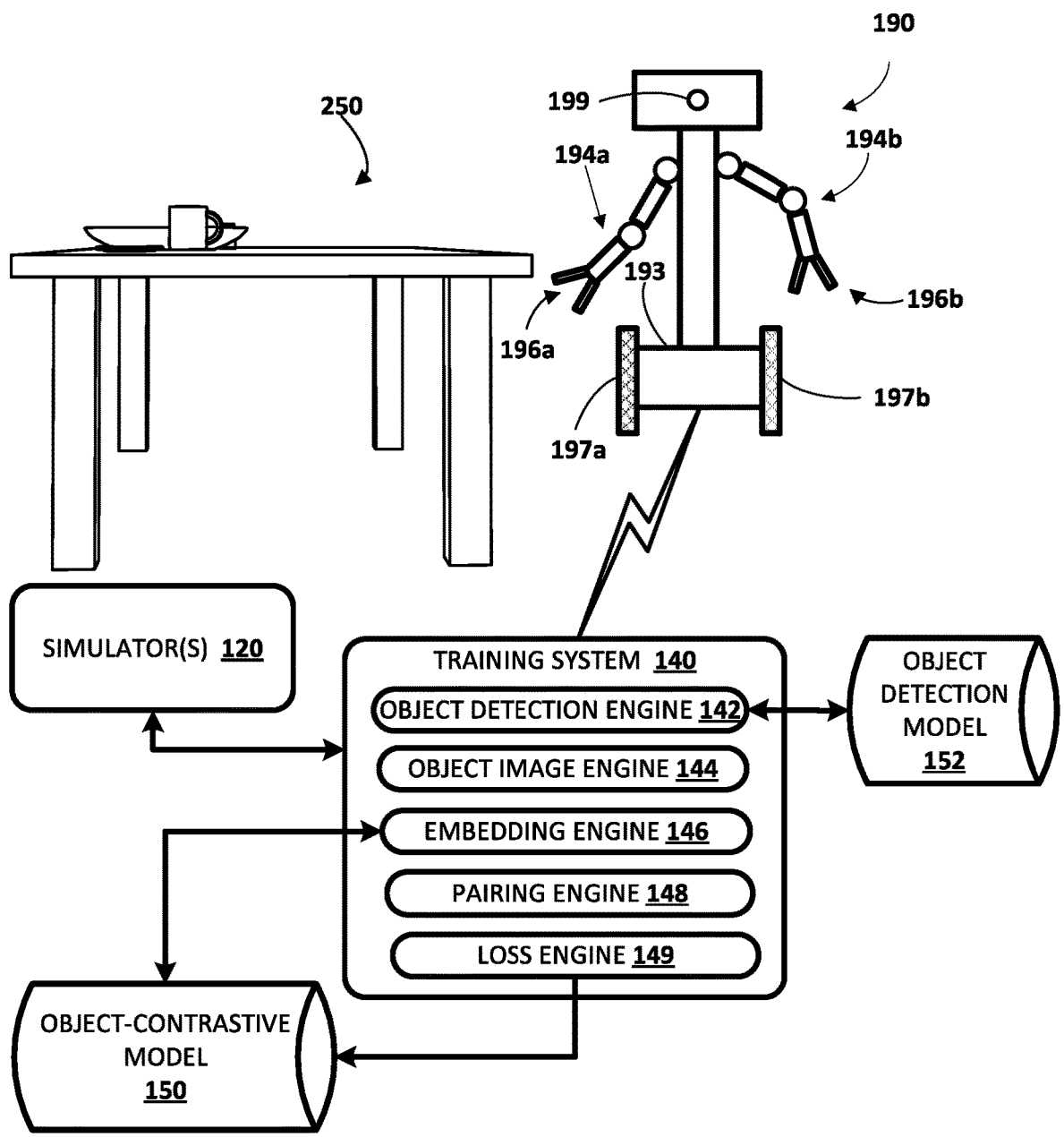
FIG. 1 illustrates an example environment in which an object-contrastive model can be trained and/or utilized in control of a robot.
Figure 2A:
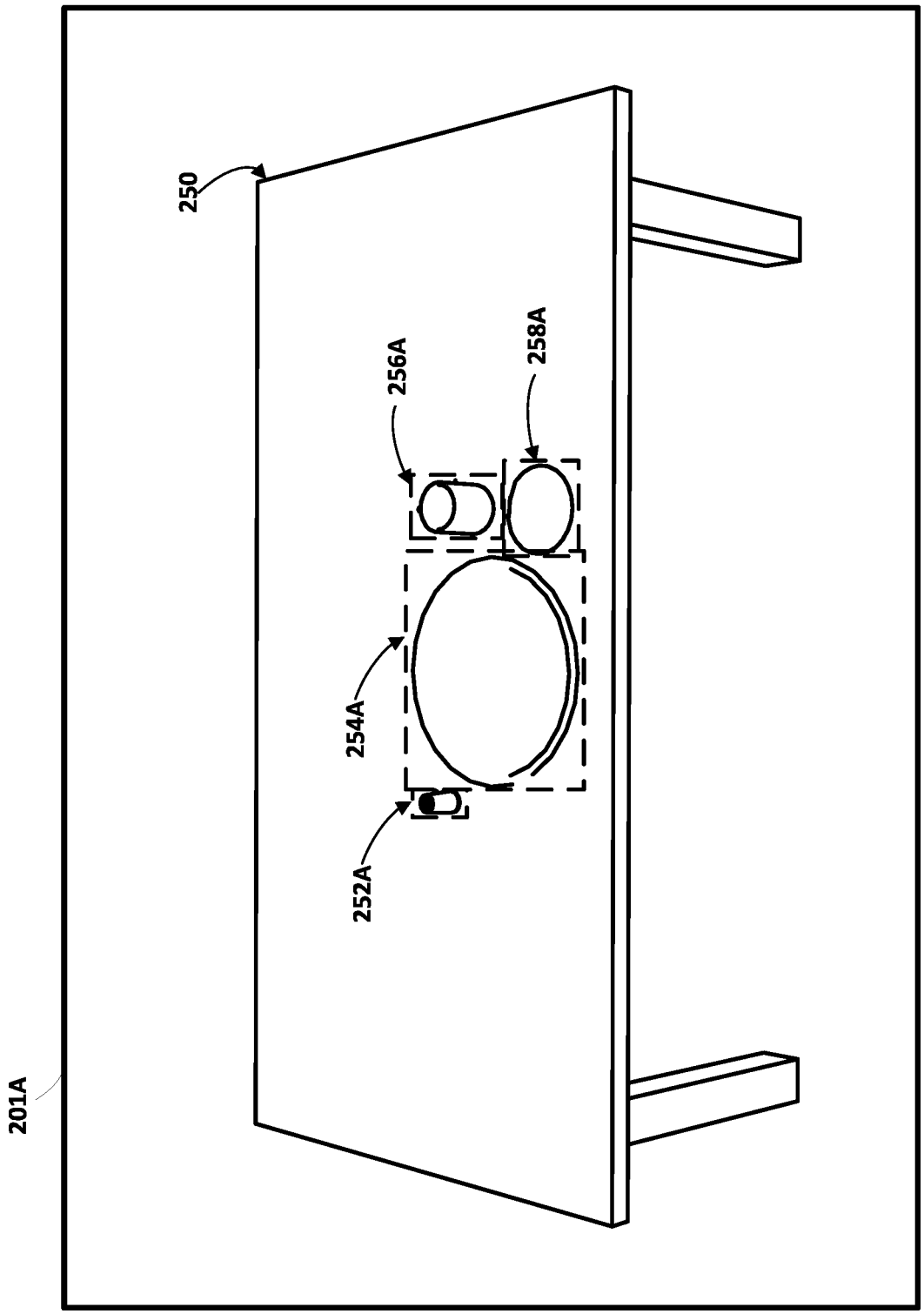
FIG. 2A illustrates an example of a first image of static objects in an environment, selected from a camera trajectory of images of the environment.
Figure 2B:
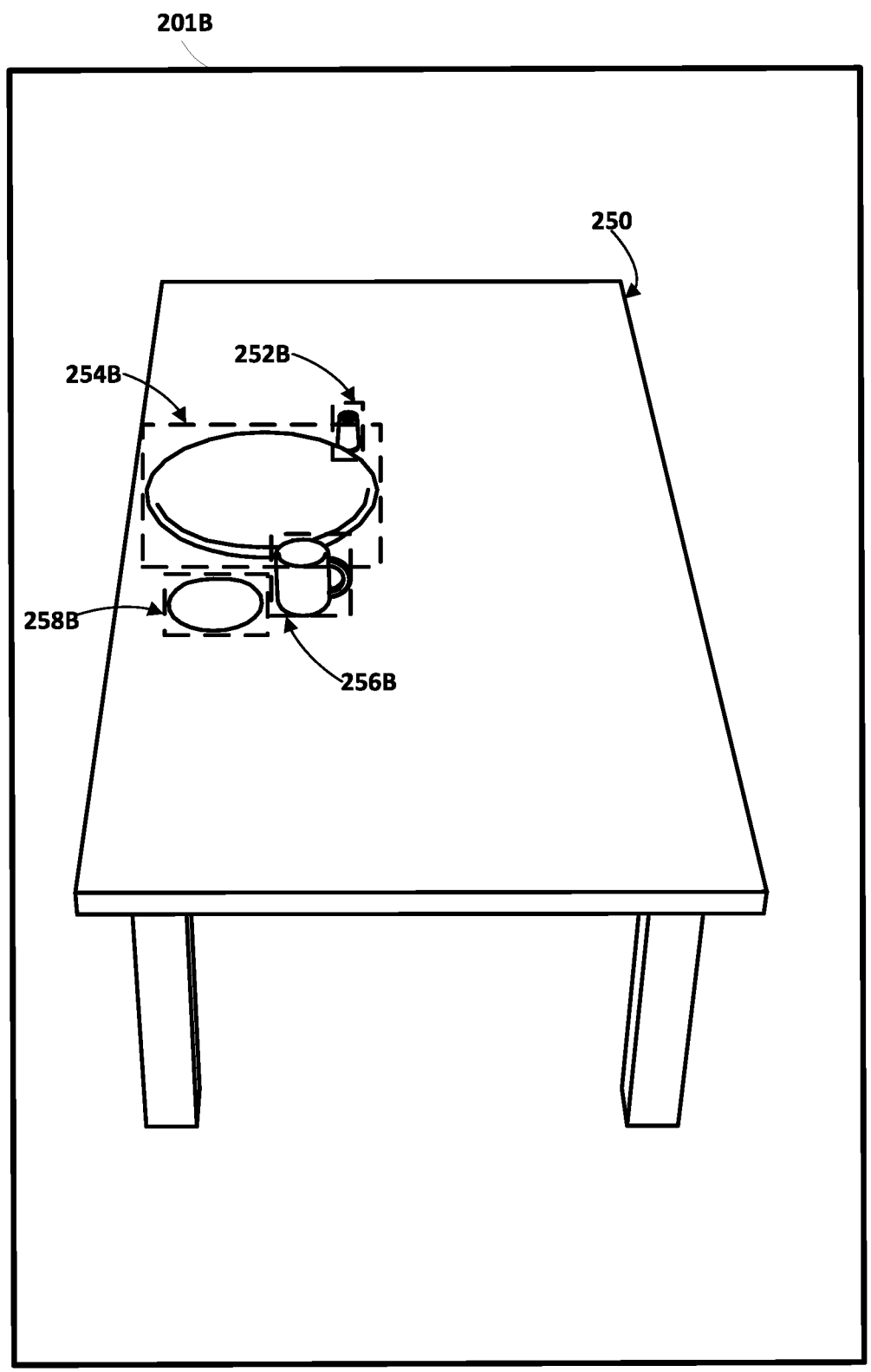
FIG. 2B illustrates an example of a second image of the static objects in the environment, selected from the camera trajectory of images of the environment.

Turning now to the Figures, FIG. 1 illustrates an example environment in which an object-contrastive model 150 can be trained and/or utilized in control of a robot, such as example robot 190. FIG. 1 includes a training system 140, which is implemented by one or more computer systems. The training system 140 interfaces with one or more simulators 120, one or more robots (e.g., robot 190), and/or one or more human-held cameras in obtaining camera trajectories of images for various environments with various objects. For example, robot 190 can navigate partially or all the way around table 250, while directing its vision component 199 toward the table 250, to generate a camera trajectory of images from the vision component 199. Examples of two images 201A and 201B from such a camera trajectory are illustrated in FIGS. 2A and 2B, described in more detail below. Other camera trajectories can likewise be captured with different environments, different objects and/or object arrangements, and optionally using different vision components. Camera trajectories can additionally or alternatively be generated using simulator 120, with simulated environments and objects. Moreover, camera trajectories from human-held vision components can additionally or alternatively be utilized.

The training system 140 utilizes images from the camera trajectories to generate self-supervised training data for training the object-contrastive model 150. The training system 140 is illustrated as including an object detection engine 142, an object image engine 144, an embedding engine 146, a pairing engine 148, and a loss engine 149. In other implementations, fewer or more engines can be provided, and/or one or more aspects of one or more engines can be combined.

The training system 140, at each of a plurality of iterations during training, selects image frames from a camera trajectory. The training system 140 can select the image frames randomly, which includes truly randomly and pseudo-randomly. As a working example, the training system 140 can select image 201A (FIG. 2A) and image 201B (FIG. 2B) at a given iteration during training. Images 201A and 201B can be captured by robot 190 while navigating around table 250. Images 201A and 201B each capture a variety of static objects on the table 250.

The object detection engine 142 utilizes an object detection model 152 to process each of the images selected by the training system 140, to detect region(s) of the images that include objects. Continuing with the working example, the object detection engine 142 can process the image 201A to identify regions 252A, 254A, 256A, and 258A that each correspond to a respective object. Likewise, the object detection engine 142 can process the image 201B to identify regions 252B, 254B, 256B, and 258B that each correspond to a respective object.

In some implementations, the object detection model 152 can be, for example, a faster-RCNN model and/or other model that generates class agnostic bounding box proposals of objects present in an image. The bounding box proposals can each be an object region. Faster-RCNN generates, in a first step, class agnostic bounding box proposals of objects present in what is often referred to as objectness detection. In a second step utilizing faster-RCNN the bounding boxes are classified and then associated with labels. However, in implementations where faster-RCNN and/or other techniques are utilized, the bounding boxes or other region identifiers can be utilized, without utilization of any classifications generated by those techniques. Rather, as described below, the object-centric model 150 is utilized to extract and organize features of the detected objects.

The object image engine 144 generates object images for each of the objects detected in the images by the object detection model 152. Each object image corresponds to an object from a respective image, and can be generated based on a respective bounding box or other spatial identifier generated by the object detection engine 142. Continuing with the working example, and with references to FIGS. 2A, 2B, and 3, object image engine 144 can generate object images 352, 354, 356, and 358 that correspond to respective regions 252A, 254A, 256A, and 258A of the first image 201A of FIG. 2A. Likewise, object image engine 144 can generate object images 362, 364, 366, and 368 that correspond to respective regions 252B, 254B, 256B, and 258B of the second image 201B of FIG. 2B.

The embedding engine 146 generates an embedding for each of the object images generated by the object image engine 144. The embedding engine 146 can generate each of the embeddings by processing a respective image using the currently trained version of the object-contrastive model 150. Continuing with the working example, the embedding engine 146 can generate a respective embedding for each of object images 352, 354, 356, and 358, and can generate a respective embedding for each of object images 362, 364, 366, and 368. In various implementations, the object-contrastive model 150 includes a plurality of convolutional layers. In some of those various implementations, the object-contrastive model 150 appends convolutional layer(s) to a pre-trained portion (that itself can contain convolutional and/or other layers) that is initialized with pre-trained weights. As one non-limiting example, two convolutional layers, followed by a spatial softmax layer, can be appended on top of the Inception model (e.g., after "Mixed 5D" layer), where the Inception model is initialized with ImageNet pre-trained weights. In other implementations, all layers of the object-contrastive model 150 may not be initialized with any pre-trained weights. For example, they may instead be initialized with random weights. Even in these other implementations, the non-initialized object-contrastive model 150 can be trained to generate rich object-centric embeddings, even though it was not pre-trained in a meaningful way. Thus, the techniques described herein may, somewhat unexpectedly, facilitate improved performance of robotic agents without the need for pre-training of the object-contrastive model and the associated computational resource use.

Figure 3:
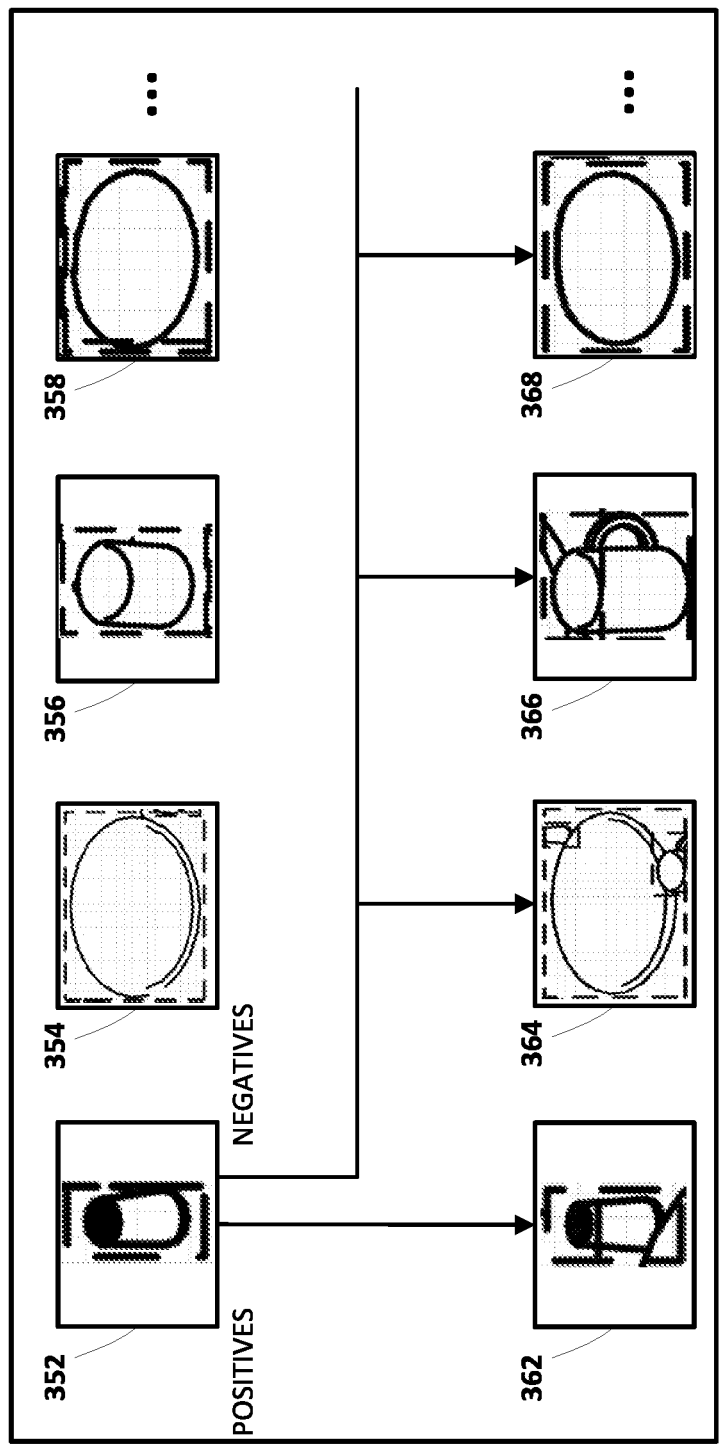
FIG. 3 illustrates example first object images that are based on the first image and its object detections, example second object images that are based on the second image and its object detections, and an example anchor, positive pairs and example anchor, negative pairs.

The pairing engine 148 generates a plurality of anchor, positive pairs, where each of the anchor, positive pairs includes a respective embedding for a first object image and a respective embedding for a second object image. Continuing with the working example, the pairing engine 148 can generate anchor, positive pairs that each include a respective one of the object images 352, 354, 356, and 358 as the anchor, and include a respective one of the object images 362, 364, 366, and 368 as a positive pairing. For example, as illustrated in FIG. 3, the embedding for object image 352 can be used as an anchor and positively paired with object image 362. The pairing engine 148 can positively pair the embedding for object image 352 with the embedding object image 362 based on determining that a distance, in embedding space, between the embedding for object image 352 and the embedding for object image 362 is less than each of the distances between the embedding for object image 352 and the embeddings for object images 364, 366, and 368.

Also illustrated in FIG. 3 are anchor, negative pairs where the embedding for the object image 352 is the anchor. In particular, each of the pairings of the embedding for the object image 352 with the embeddings for object images 364, 366, and 368 is an anchor, negative pair. It is noted that in some implementations (e.g., where the metric loss is n-pairs loss) there is not an explicit formulation of anchor, negative pairs, but, instead the other positives are used as negatives in a minibatch as negative examples for a given anchor, positive pair. Although not explicitly illustrated in FIG. 3, the pairing engine 148 will also generate an anchor, positive pair using the image 354 as an anchor, will also generate an anchor, positive pair using the image 356 as an anchor, and will also generate an anchor, positive pair using the image 358 as an anchor. Additional anchor, negative pairs can also optionally be generated in a similar manner.

As a more formal representation of pairing engine 148 generating anchor, positive pairs, assume object images $\theta_n$ and $\rho_m$, where n and m respectively represent the number of detected objects. The embedding of an object image x is defined as the function $f(x)$, represented by a convolutional neural network. The embeddings of object images $\theta_n$ and $\rho_m$ can be generated as $x_n^\theta$ and $x_m^\rho$ and $x_n^\theta$ defined as anchors: $x_n^a$. The distance matrix $D_M = \sqrt{(x_n^\theta - x_m^\rho)^2}$ can be computed and the embeddings $x_n^\rho$ with minimum distance selected as positives: $x_m^P = \text{argmin}(D_{n,m})$.

The loss engine 149 generates a loss based on the positive, anchor pairs, and updates weights of the object-centric model 150 based on the generated loss. The loss can be a metric loss such as n-pairs loss, triplet loss, and/or other metric loss. The updating of the weights of the object-centric model 150 can include updating weights of only certain layers (e.g., those appended to a pre-trained portion) or updating weights of all layers of the model.

As a more formal example of the loss engine 149 generating an n-pairs loss, and continuing with the above notation, the n-pairs loss can be represented as $$N \text{ Pairs}(a, p) = \sum_{i<B} -\log\left(\frac{x^a i T_{pi}}{\sum_{j < B} x^{ai}}, p_j\right) + \lambda(\|a_i\|_2^2 + \|p_i\|_2^2),$$

where i is the index of an anchor, j denotes the index of a positive, B is the batch size (e.g., B=1), and $\lambda$ a regularization term on the embedding vectors (e.g., $\lambda=0.002$). The loss is formulated as the sum of softmax cross-entropy losses for each anchor i against all positives p and the goal is to maximize $a_i T p_i$ while minimizing $a_i T p_{j\neq i}$. As the number of anchors and positives are not guaranteed to be equal, this loss is asymmetric. Therefore, the final training objective can be formulated as: $\mathcal{L}_{OCN} = \text{NPairs}(x_n^\theta, x_n^\rho) + N \text{ Pairs}(x_m^\rho, x_n^\theta)$. Similar to other metric learning objectives, the goal of n-pairs loss is to push objects with similar features together, while objects with dissimilar features are pulled apart. In contrast to other techniques, n-pairs loss does not rely on the explicit formulation of negatives, but instead uses the other positives in a minibatch as negative examples for a given (anchor, positive)-pair.

Although example description above of engines 142, 144, 146, 148, and 149 is provided with respect to a single image pair from a single camera trajectory, it is understood that the engines will perform similar techniques for a large quantity of image pairs from a large quantity of camera trajectories. For example, thousands of camera trajectories can be provided and multiple image pairs utilized from each of the camera trajectories. Through such continued training and through such large quantity of self-supervised training, the object-contrastive model 150 is trained to generate an embedding that enables differentiation of subtle variations of object attributes.

Example robot 190 is illustrated in FIG. 1 as one example of a robot that can utilize object-contrastive model 150, when trained, in performance of various robotic tasks. Robot 190 is also one example of a robot that can be utilized to generate camera trajectories described herein.

The robot 190 includes robot arms 194a and 194b with corresponding grasping end effectors 196a and 196b, that each take the form of a gripper with two opposing actuable members. The robot 190 also includes a base 193 with wheels 197a and 197b provided on opposed sides thereof for locomotion of the robot 190. The base 193 may include, for example, one or more motors for driving corresponding wheels 197a and 197b to achieve a desired direction, velocity, and/or acceleration of movement for the robot 190.

The robot 190 also includes a vision component 199. Vision component 199 generates images related to shape, color, depth, and/or other features of object(s) that are in the line of sight of its sensor(s). The vision component 184 can be, for example, a monographic camera (e.g., generating 2D RGB images), a stereographic camera (e.g., generating 2.5D RGB images), and/or a laser scanner (e.g., generating 2.5D "point cloud" images). As described herein, the robot 190 may operate autonomously at least part of the time and control actuators thereof in performance of various actions. For example, in performing various actions, one or more processors of the robot 190 may provide control commands to actuators associated with the wheels 197a and/or 197b, the robot arms 194a and/or 194b, and/or the end effectors 196a and/or 196b.

Although a particular robot 190 is illustrated in FIG. 1, additional and/or alternative robots may be utilized, including additional robot arms that are similar to robot 190, robots having robot arm forms, robots having a humanoid form, robots having an animal form, other robots that move via one or more wheels, an unmanned aerial vehicle ("UAV"), and so forth. Also, although a particular end effectors are illustrated in FIG. 1, additional and/or alternative end effectors may be utilized to interact with objects.

The simulator(s) 120 are implemented by one or more computer systems, and can be used to simulate various environments that include corresponding environmental objects and corresponding placement location(s). Various simulators can be utilized, such as physics engines that simulate collision detection, soft and rigid body dynamics, etc. One non-limiting example of such a simulator is the BULLET physics engine.

Figure 4A:
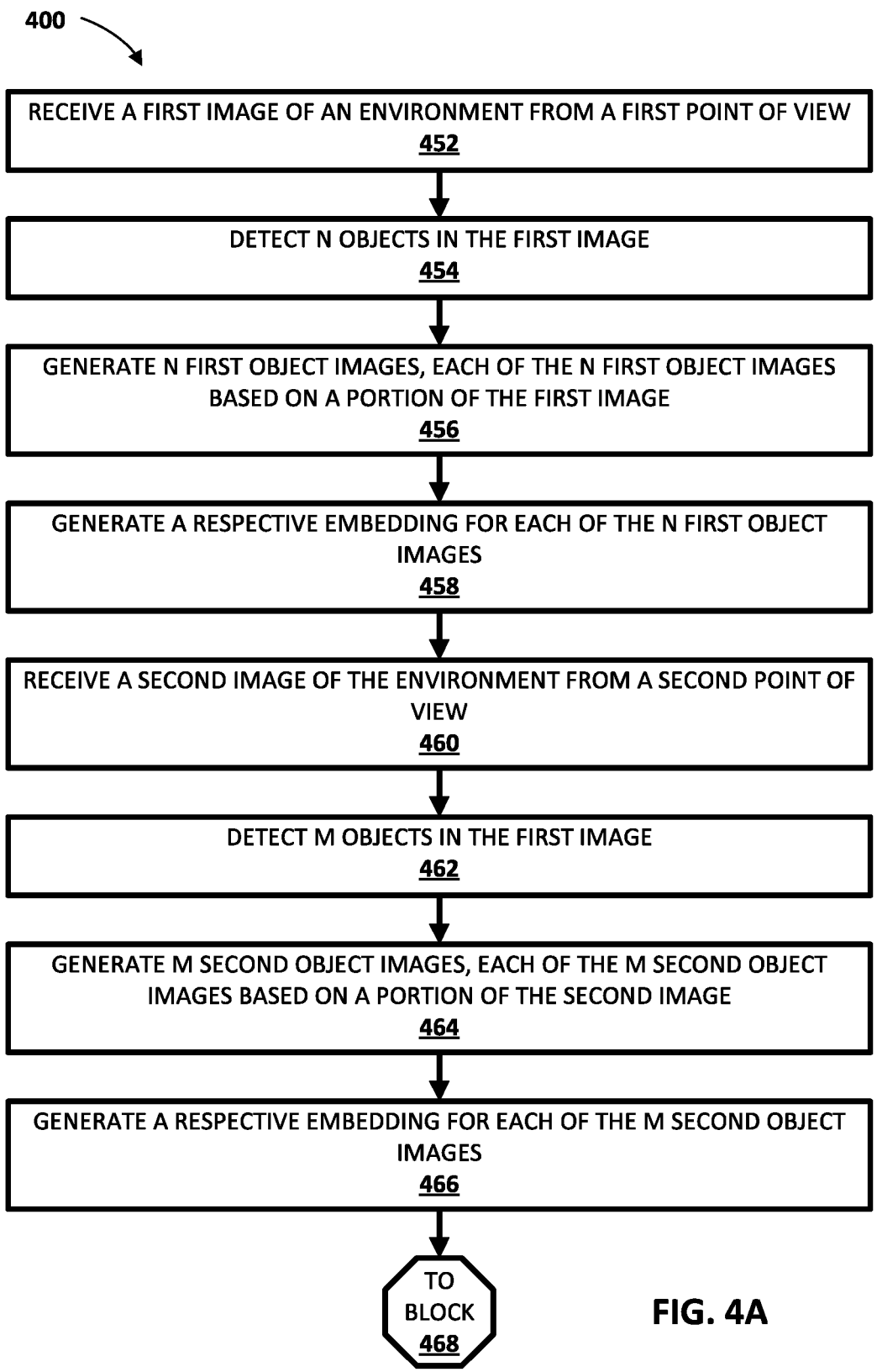
FIGS. 4A and 4B is a flow chart of an example method of training an object-contrastive model to generate rich object-centric embeddings, according to various implementations disclosed herein.
Figure 4B:
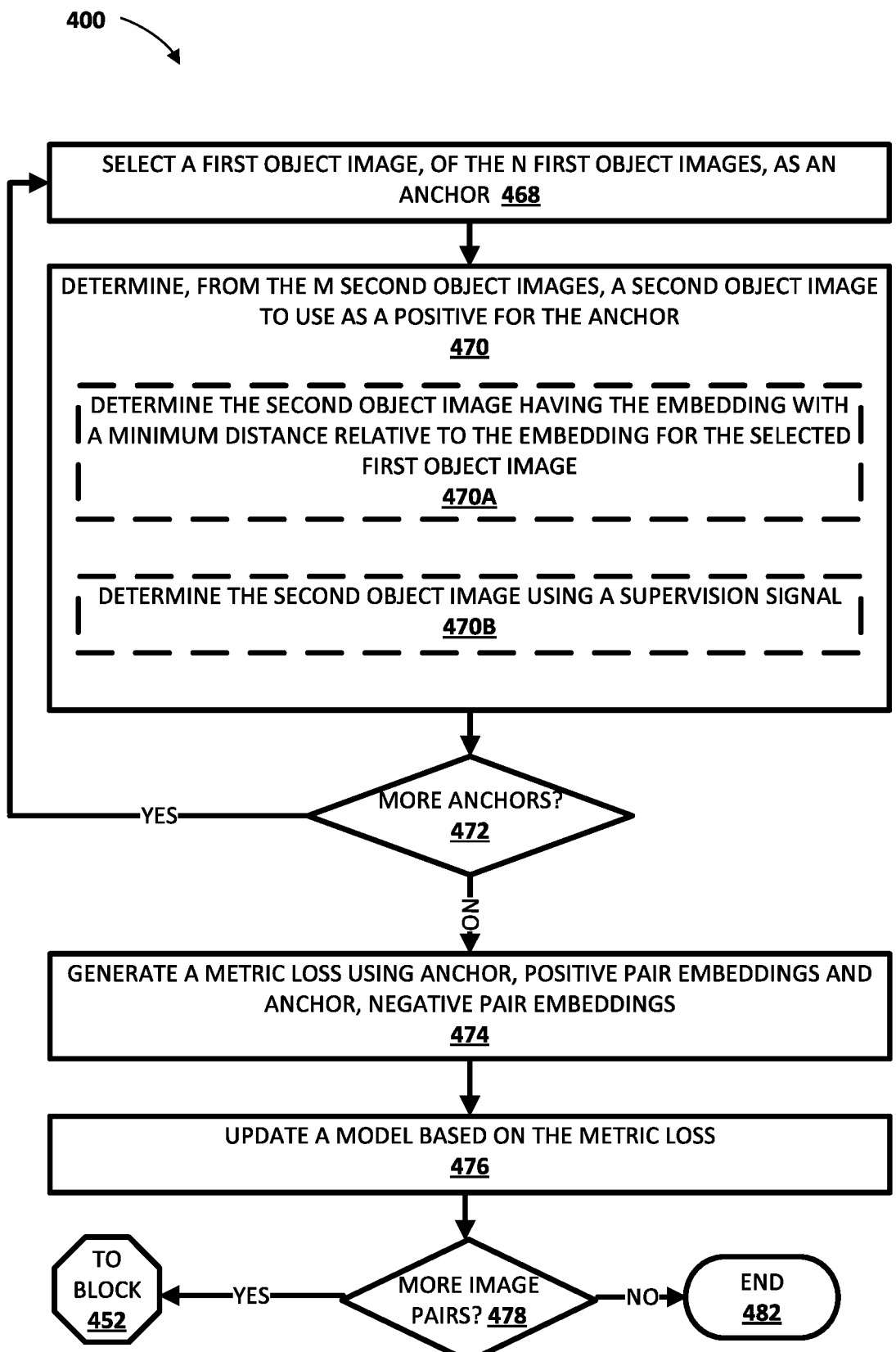

Turning now to FIGS. 4A and 4B, a flow chart is illustrated of an example method 400 of training an object-contrastive model to generate rich object-centric embeddings, according to various implementations disclosed herein. For convenience, the operations of the flow chart are described with reference to a system that performs the operations. The system can include one or more components of a robot and/or one or more components of a separate computing system. Additionally, while the operations of the flowchart are shown in a particular order, this is not meant to be limiting. One or more operations may be reordered, omitted or added.

At block 452, the system receives a first image of an environment, where the first image is captured from a first point of view and captures a plurality of objects in the environment. The first image is an image of a camera trajectory of images as described herein. As further described herein, the camera trajectory of images can be real images captured by a physical vision component, or simulated images rendered using a simulator. As one example, the camera trajectory of images can be captured, by a vision component, as the vision component moves about an environment with a plurality of object, while being directed to attempt to keep the plurality of objects in view.

At block 454, the system detects N objects in the first image of the environment. For example, the system can detect the N objects by processing the first image using an object detection model, where N is an integer number. For instance, processing the first image using the object detection model can result in bounding boxes, each corresponding to a region of the first image, and the bounding boxes can each define a respective one of the N objects. In some implementations, constraints can be imposed so that bounding boxes that are smaller than a threshold area and/or larger than a threshold area are discarded and not considered as an object detection. This can remove very small and/or very large objects from consideration.

At block 456, the system generates N first object images, where each of the N first object images is based on a portion of the first image. For example, each of the N first object images can be based on a respective one of the bounding boxes that can be determined at block 454. For instance, each of the N first object images can be a cropped, and optionally scaled, portion of the first image. For instance, a first of the N first object images can be a crop of a bowl captured by the first image, a second of the N first object images can be a crop of a plate captured by the first image, etc.

At block 458, the system generates a respective embedding for each of the N first object images. The system can generate each of the respective embeddings by processing a corresponding one of the N first object images using an object-contrastive model that is being trained. For example, a first embedding for a first object image can be generated based on processing a first object image using the object-contrastive model, a second embedding for the first object image can be generated based on processing a second object image using the image-contrastive model, etc.

At block 460, the system receives a second image of the environment, where the second image is captured from a second point of view that is different from the first point of view of block 452. The second image can be from the same camera trajectory as that of block 452. The second image captures at least a subset of the plurality of object in the environment that are captured by the first image. In some situations, the first image and the second image capture the same objects and the objects are static within the environment. In some situations, the objects are static within the environment, but one or more objects captured by the first image are not captured by the second image, or vice versa. This can be due to, for example, certain object(s) being occluded in the image(s).

At block 462, the system detects M objects in the second image. For example, the system can detect the M objects by processing the first image using an object detection model, where M is an integer number. In some situations, M and N (block 454) can be the same. For example, where the first image and the second image capture the same objects, M and N can be the same. In some other situations, M and N can differ. For example, where object(s) are occluded in one of the first image and the second image, then M and N can differ.

At block 464, the system generates M second object images, where each of the M second object images is based on a portion of the second image. For example, each of the M second object images can be based on a respective bounding box (or other spatial identifier) that can be determined at block 462. For instance, each of the M second object images can be a cropped, and optionally scaled, portion of the second image. It is noted that many (and all when N=M) of the second object images will capture a respective object that is also captured by a respective one of the first object images. However, the images will differ due to the differing points of view of the first and second images, which can result in different potion(s) of the objects being visible, differing lighting conditions, different partial or full occlusions, etc.

At block 466, the system generates a respective embedding for each of the M object images. The system can generate each of the respective embeddings by processing a corresponding one of the M object images using an object-contrastive model that is being trained.

At block 468, the system selects a first object image, of the N first object images, as an anchor image. In various implementations, selecting the first object image includes (or is restricted to) selecting the generated embedding for the first object image.

At block 470, the system determines, from the M second object images, a second object image to use as a positive for the anchor. In various implementations, determining the second object image to use as the positive includes (or is restricted to) determining, as the positive, the embedding for the second object image. Block 470 can optionally include sub-block 470A or 470B.

Sub-block 470A is utilized in many implementations and represents a self-supervised technique for selecting the second object image to use as the positive for the anchor. At sub-block 470A, the system determines the second object image having the embedding with a minimum distance relative to the embedding for the selected first object image. For example, at sub-block 470A the system determines the second object image based on a distance metric between its generated embedding, and the generated embedding for the selected first object image, being the smallest (relative to distance metrics between generated embeddings for the other second object images, and the generated embedding for the first object image).

Optional sub-block 470B can be utilized in lieu of sub-block 470A in some iterations. At sub-block 470B the system determines the second object image using a supervision signal. For example, the supervision signal can be an identifier generated by a simulator (when the first and second images are simulated). The identifier can be, for example, a color identifier, a pattern identifier, and/or other identifier assigned by the simulator. For example, the simulator can assign a unique color to each of the simulated objects captured by a simulated camera trajectory, and use the unique color as an identifier to match anchor object images to positive object images (i.e., matching images having the same color).

At block 472, the system determines whether there are more anchors. For example, if the system determines there are remaining first object images, from the N first object images, that have not been utilized as anchors, the system can determine there are more anchors for the first image. If so, the system proceeds back to block 468 and selects another first object image as a new anchor, and proceeds to block 470 to determine a respective positive.

If, at an iteration of block 472, the system determines there are not more anchors, the system proceeds to block 474. At block 474, the system generates a metric loss using embeddings for the anchor, positive pairs (generated in iterations of blocks 468 and 470), and optionally using anchor, negative pair embeddings. It is noted that in some implementations (e.g., where the metric loss is n-pairs loss) there is not an explicit formulation of anchor, negative pairs, but, instead the other positives are used as negatives in a minibatch as negative examples for a given anchor, positive pair.

At block 474, the system updates the object-contrastive model based on the metric loss. For example, the system can utilize backpropagation to update one or more weights of the model based on the metric loss.

At block 478, the system determines whether there are more image pairs, from the same camera trajectory or other camera trajectories, to process. In some implementations, the system can determine there are if any unprocessed image pairs remain and/or if other training criteria is not yet satisfied. The other training criteria can include a threshold number of training epochs, a threshold duration of training time, and/or other criterion/criteria.

If the system determines there are more image pairs to process, the system proceeds back to block 452, selects another image pair, the performs the further blocks of method 400 using the other image pair. Through a large quantity of iterations of method 400, using a large quantity of image pairs, a robust object-contrastive model is trained. If, at an iteration of block 478, the system determines there are no more image pairs to process, the system proceeds to block 480, and training ends. The trained object-contrastive model can then be utilized for one or more purposes, such as robotic control. For example, the trained object-contrastive model can be stored locally at a robot, and utilized by the robot in one or more aspects of robotic control.

Figure 5:
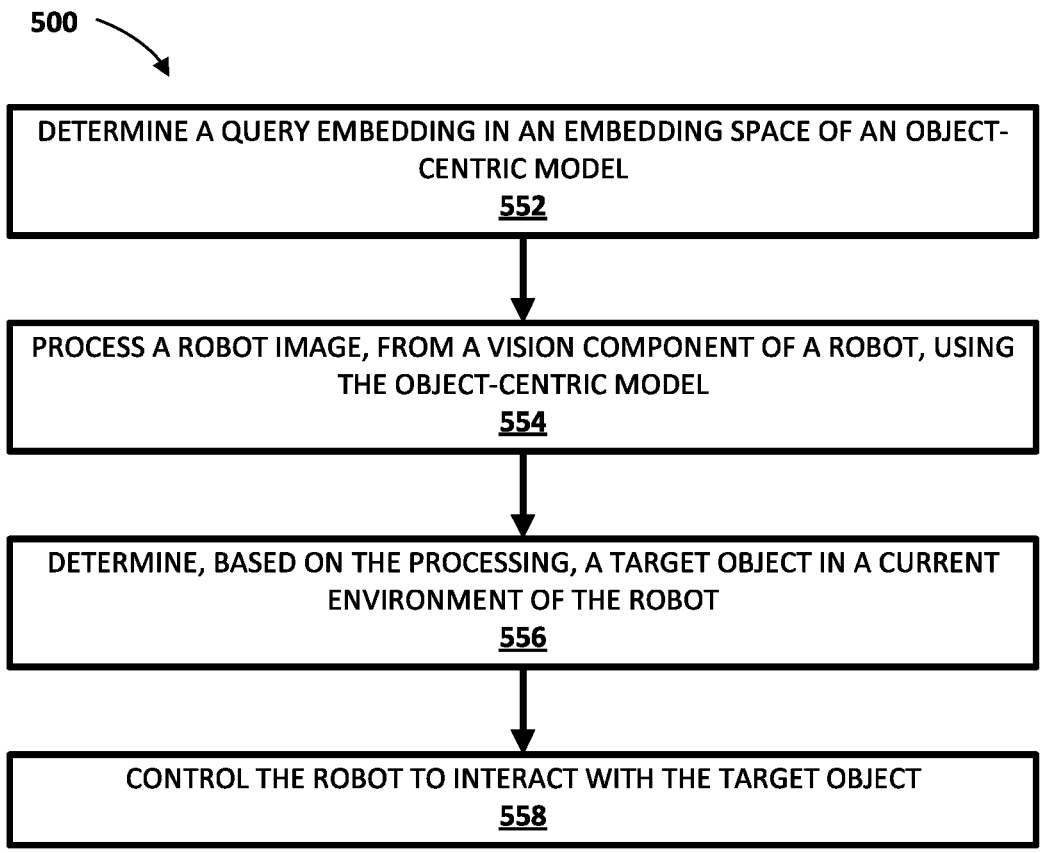
FIG. 5 is a flow chart of an example method of controlling a robot based on a trained object-contrastive model.

Turning now to FIG. 5, a flow chart is illustrated of an example method 500 of controlling a robot based on a trained object-contrastive model. For convenience, the operations of the flow chart are described with reference to a system that performs the operations. The system can include one or more components of a robot and/or one or more components of a separate computing system. Additionally, while the operations of the flowchart are shown in a particular order, this is not meant to be limiting. One or more operations may be reordered, omitted or added.

At block 552, the system determines a query embedding, in an embedding space of an object-centric model. In some implementations, the query embedding can be determined based on voice input and/or based on an image of an object. For example, "red mug" in voice input of "retrieve the red mug" can be mapped to a given point in the embedding space (e.g., through labeling of the embedding space with semantic text labels after training), and the given point utilized as the query embedding. Also, for example, a user can point to a "red mug" and provide a visual, verbal, and/or touch command to retrieve similar objects. Image(s) of the "red mug" can be captured, using the user's pointing as a queue, and the image(s) processed using the object-contrastive model to determine a query embedding.

At block 554, the system processes a robot image, from a vision component of a robot, using the object-centric model disclosed herein.

At block 556, the system determines, based on the processing of block 554, a target object in a current environment of the robot. For example, target object can be determined to correspond to a region of the robot image that has a respective embedding that is within a threshold distance of the query embedding. The region of the robot image can be one of multiple regions considered and can be identified, for example, using an object detection model described herein.

At block 558, the system controls the robot to interact with the target object. For example, the system can localize (e.g., determine a pose of) the target object, and control one or more components of the robot to interact with the target object based on its localization. For example, the system can generate control commands, and provide the control commands to actuators of the robot, to cause an end effector and/or other component(s) of the robot to interact with the target object.

Figure 6:
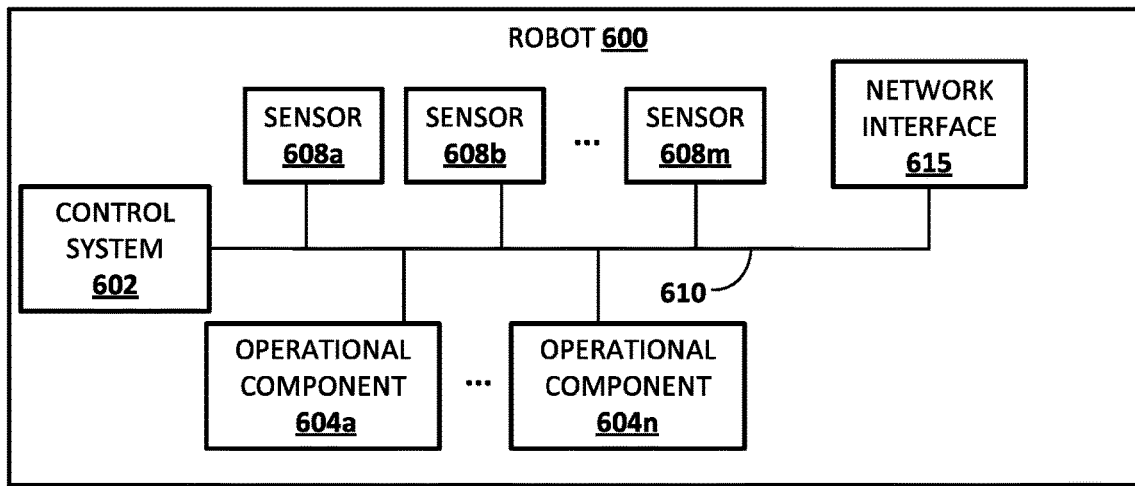
FIG. 6 schematically depicts an example architecture of a robot.

FIG. 6 schematically depicts an example architecture of a robot 600. The robot 600 includes a robot control system 602, one or more operational components 604a-604n, and one or more sensors 608a-608m. The sensors 608a-608m may include, for example, vision components, light sensors, pressure sensors, pressure wave sensors (e.g., microphones), proximity sensors, accelerometers, gyroscopes, thermometers, barometers, and so forth. While sensors 608a-608m are depicted as being integral with robot 600, this is not meant to be limiting. In some implementations, sensors 6608a-608m may be located external to robot 600, e.g., as standalone units.

Operational components 604a-604n may include, for example, one or more end effectors and/or one or more servo motors or other actuators to effectuate movement of one or more components of the robot. For example, the robot 600 may have multiple degrees of freedom and each of the actuators may control actuation of the robot 600 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 602 may be implemented in one or more processors, such as a CPU, GPU, and/or other controller(s) of the robot 600. In some implementations, the robot 600 may comprise a "brain box" that may include all or aspects of the control system 602. For example, the brain box may provide real time bursts of data to the operational components 604a-604n, with each of the real time bursts comprising a set of one or more control commands that dictate, inter alia, the parameters of motion (if any) for each of one or more of the operational components 604a-604n. In some implementations, the robot control system 860 may perform one or more aspects of one or more methods described herein.

As described herein, in some implementations all or aspects of the control commands generated by control system 602 can be based on control commands generated based on utilization of an object-centric model trained according to implementations disclosed herein. For example, a vision component of the sensors 608a-608m may capture a current image, and the robot control system 602 may process all or portions of the current image using the object-centric model, then determine control commands based on an embedding generated based on the processing. Although control system 602 is illustrated in FIG. 6 as an integral part of the robot 600, in some implementations, all or aspects of the control system 602 may be implemented in a component that is separate from, but in communication with, robot 600. For example, all or aspects of control system 602 may be implemented on one or more computing devices that are in wired and/or wireless communication with the robot 600, such as computing device 710.

Figure 7:
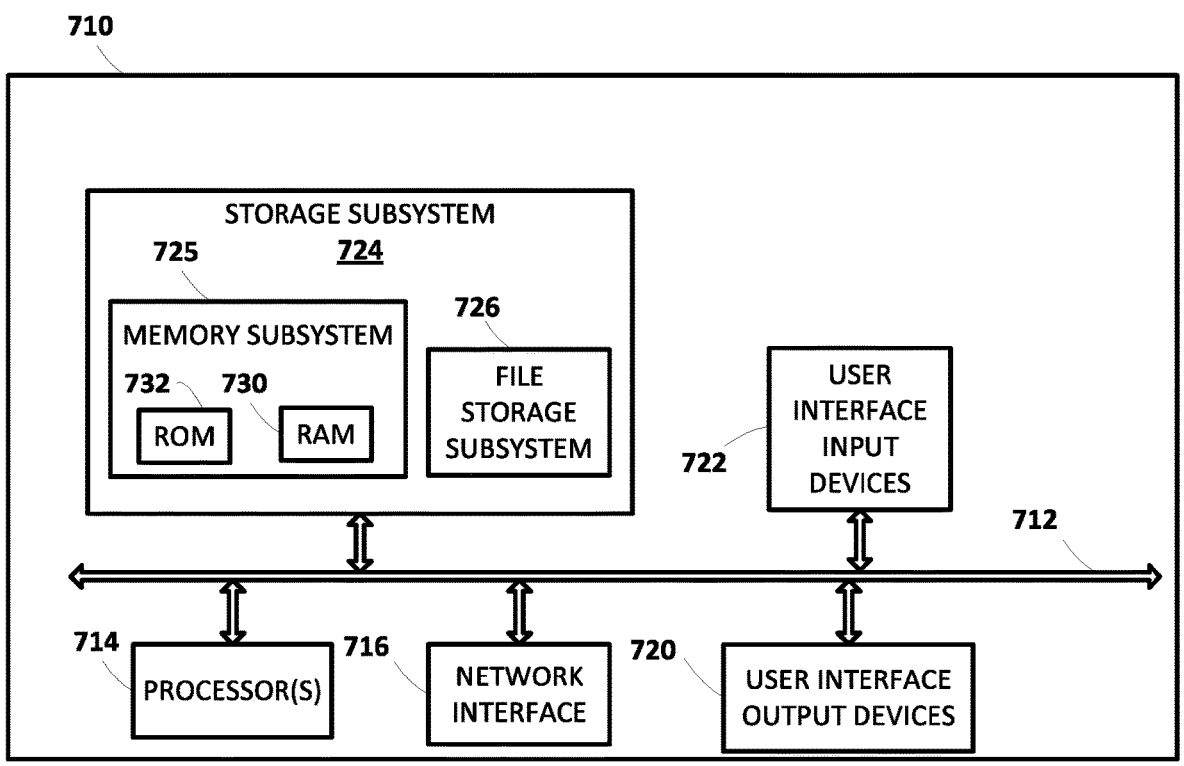
FIG. 7 schematically depicts an example architecture of a computer system.

FIG. 7 is a block diagram of an example computing device 710 that may optionally be utilized to perform one or more aspects of techniques described herein. For example, in some implementations computing device 710 may be utilized to operate robot simulator(s) and/or may be utilized in training an object-contrastive model. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in Fig.

What is claimed is:

1. A method implemented by one or more processors, the method comprising:
   identifying a first image of an environment, the first image capturing objects in the environment and being captured from a first point of view;
   identifying a second image of the environment, the second image capturing at least a subset of the objects in the environment and being captured from a second point of view;
   processing the first image using an object recognition model to identify a plurality of first object regions in the first image, each of the first object regions corresponding to a respective one of the objects captured by the first image;
   generating a plurality of first object images based on the first object regions, each of the first object images being based on a respective one of the first object regions and capturing a respective one of the objects;
   processing the second image using the object recognition model to identify a plurality of second object regions in the second image, each of the second object regions corresponding to a respective one of the objects captured by the second image;
   generating a plurality of second object images based on the second object regions, each of the second object images being based on a respective one of the second object regions and capturing a respective one of the objects;
   processing each of the first object images using an object-contrastive model to generate respective first object image embeddings, wherein the object-contrastive model is a deep neural network model;
   processing each of the second object images using the object-contrastive model to generate respective second object image embeddings;
   generating a plurality of anchor, positive pairs that each include a respective one of the first object image embeddings and a respective one of second object image embeddings determined to be most similar to the respective one of the first object image embeddings;
   generating at least one metric loss based on contrasting the anchor, positive pairs with anchor, negative pairs that each include a respective one of the first object image embeddings and a respective one of the second object image embeddings not determined to be most similar to the respective one of the first object image embeddings;
   updating the object-contrastive model based on the at least one metric loss.

2. The method of claim 1, wherein the environment is a real-world environment and the first image is captured by a physical robot at a first pose in the environment, and the second image is captured by the physical robot at a second pose in the environment.

3. The method of claim 1, wherein the environment is a simulated environment and wherein the first image is rendered from a first simulated camera pose in the environment and wherein the second image is rendered from a second simulated camera pose in the environment.

4. The method of claim 1, further comprising:
   determining, for each of the plurality of anchor, positive pairs that the respective one of the first object image embeddings and the respective one of the second object image embeddings are the most similar based on determining that a distance metric, between the respective one of first object image embeddings and the respective one of the second object image embeddings, is a minimum distance metric amongst differences between the first object image embeddings and the second object image embeddings.

5. The method of claim 1, wherein the first image and the second image are rendered images generated in a simulator, and further comprising:
   determining, for each of the plurality of anchor, positive pairs that the respective one of the first object image embeddings and the respective one of second object image embeddings are the most similar based on determining that an identifier, assigned in the simulator, matches between the object of the respective one of first object image embeddings and the object of the respective one of the second object image embeddings.

6. The method of claim 5, wherein the identifier, assigned in the simulator, comprises a color of the object.

7. The method of any preceding claim 1, wherein the object-contrastive model includes a plurality of convolutional layers.

8. The method of claim 7, wherein the plurality of convolutional layers include a plurality of added convolutional layers, of the convolutional layers, appended to a pre-trained portion that is initialized with pre-trained weights, and wherein the pre-trained portion also includes at least some of the convolutional layers.

9. The method of claim 8, wherein updating the object-contrastive model comprises updating weights of the added convolutional layers without updating any of the pre-trained weights.

10. The method of claim 7, wherein the object-contrastive model is not initiated with any pre-trained weights.

11. The method of claim 10, wherein updating the object-contrastive model comprises updating weights for each of multiple layers of the object-contrastive model.

12. The method of claim 1, wherein the metric loss is an n-pairs loss.

13. The method of claim 1, wherein the image comprises multiple color channels.

14. The method of claim 1, wherein the image comprises multiple color channels and a depth channel.

15. The method of claim 1, further comprising:
   using, after the updating, the object-contrastive model in control of a robot.

16. The method of claim 15, wherein using the object-contrastive model in control of the robot comprises:
   determining a query embedding, in an embedding space of the object-contrastive model;
   processing a robot image, from a vision component of the robot, using the object-contrastive model;
   determining, based on the processing, a target object in a current environment of the robot; and controlling the robot to interact with the target object.

17. The method of claim 16, wherein determining the query embedding comprises:
  receiving voice input via a microphone of the robot; and
  determining the query embedding based on it being mapped to a term included in the voice input.

18. The method of claim 16, wherein determining the query embedding comprises:
  receiving a query image of a target object; and
  processing the query image, using the object-contrastive model, to generate the query embedding.

19. A system comprising instructions stored in memory, and one or more processors executing the stored instructions to perform a method that includes:
  identifying a first image of an environment, the first image capturing objects in the environment and being captured from a first point of view;
  identifying a second image of the environment, the second image capturing at least a subset of the objects in the environment and being captured from a second point of view;
  processing the first image using an object recognition model to identify a plurality of first object regions in the first image, each of the first object regions corresponding to a respective one of the objects captured by the first image;
  generating a plurality of first object images based on the first object regions, each of the first object images being based on a respective one of the first object regions and capturing a respective one of the objects;
  processing the second image using the object recognition model to identify a plurality of second object regions in the second image, each of the second object regions corresponding to a respective one of the objects captured by the second image;
  generating a plurality of second object images based on the second object regions, each of the second object images being based on a respective one of the second object regions and capturing a respective one of the objects;
  processing each of the first object images using an object-contrastive model to generate respective first object image embeddings, wherein the object-contrastive model is a deep neural network model;
  processing each of the second object images using the object-contrastive model to generate respective second object image embeddings;
  generating a plurality of anchor, positive pairs that each include a respective one of the first object image embeddings and a respective one of second object image embeddings determined to be most similar to the respective one of the first object image embeddings;
  generating at least one metric loss based on contrasting the anchor, positive pairs with anchor, negative pairs that each include a respective one of the first object image embeddings and a respective one of the second object image embeddings not determined to be most similar to the respective one of the first object image embeddings;
  updating the object-contrastive model based on the at least one metric loss.

* * * * *